Patented Feb. 27, 1951

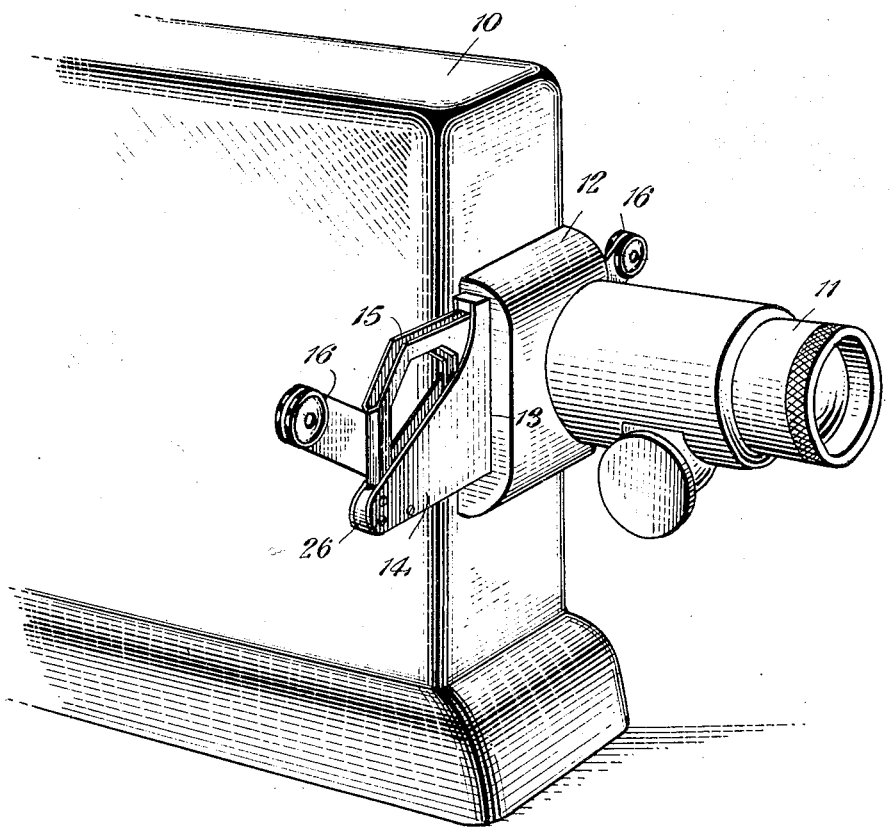

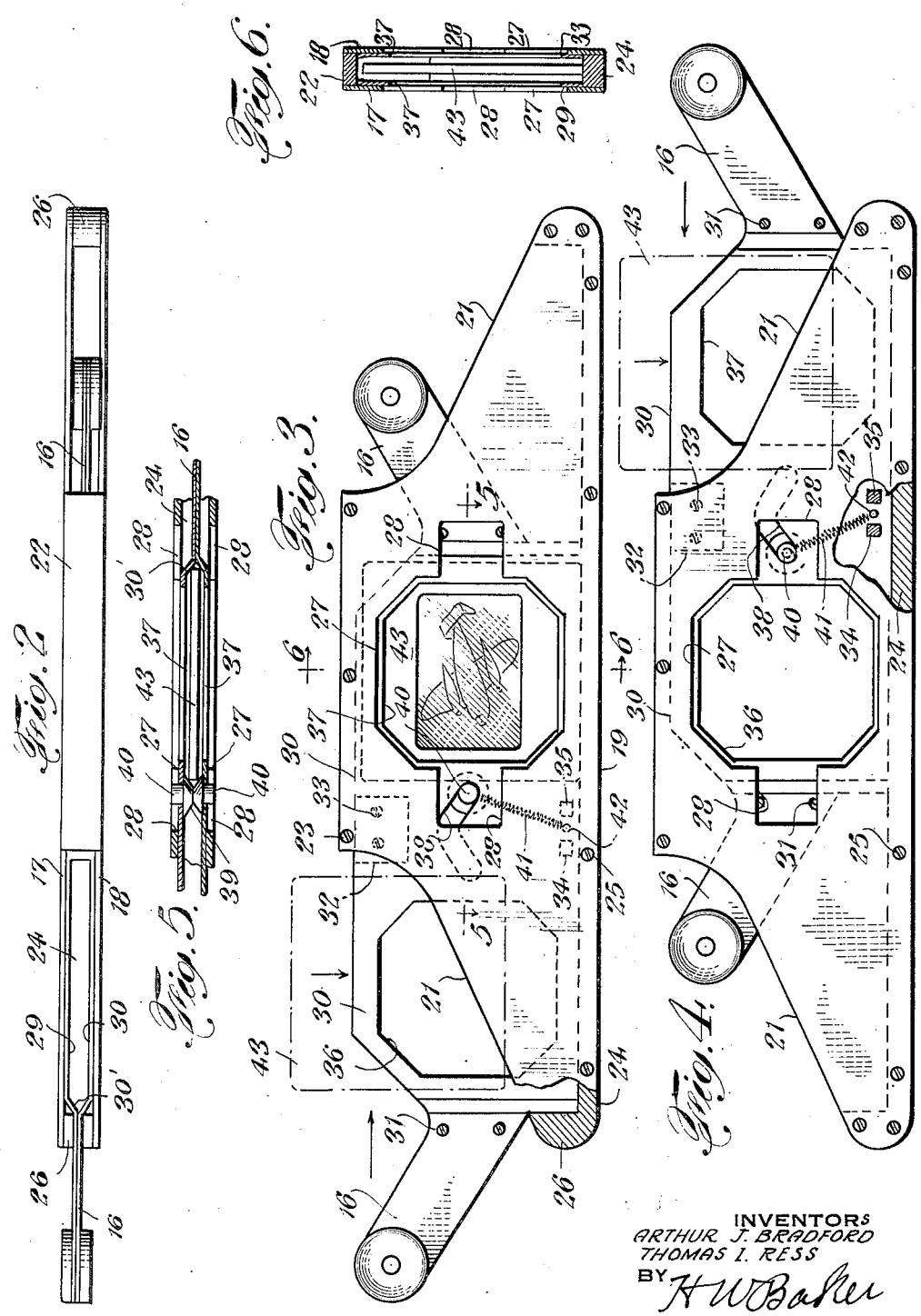

2,543,520

UNITED STATES PATENT OFFICE 2,543,520

SLIDE CHANGER

Arthur J. Bradford and Thomas I. Ress, Chicago, Ill., assignors, by mesne assignments, to Ampro Corporation, Chicago, Ill., a corporation of Illinois Application July 6, 1945, Serial No. 603,518

18 Claims. (Cl. 88—28)

1

This invention relates to new and useful improvements in slide carriers or changers for picture projectors, especially of the type where still pictures in suitable slides are inserted in the carrier and the carrier is reciprocated back and forth to alternately project the successive pictures which are successively brought into line with the optical axis of the device.

An object of the invention is to provide simple and efficient means whereby, when a picture slide is inserted into the device and the carrier is moved to present the picture in line with the optical axis, the slide is definitely postioned laterally with respect to the optical axis and also is accurately positioned with respect to a predetermined optical plane, and this double positioning of the slide takes place automatically merely by the movement of the carrier and the slide therein to the projection position.

A further object is to provide a carrier frame having a chamber in each end thereof into which a slide can be introduced by merely dropping it in the chamber. The conventional spring to hold the slide is eliminated so that when the slide is dropped in the chamber all damage to the slide is avoided. We have provided positioning means, however, which will be moved to engage the side of the slide which is being brought into viewing position so as to locate the slide precisely in the optical plane of the projector.

A still further object is to provide a carrier frame and associated parts so related that the handles of the carrier can always be readily grasped and the picture slides in the carrier can be readily removed from the carrier when the carrier is at either end of its travel.

Yet another object is to provide a structure in which the limits of movement of the carrier frame are so defined that when it reaches these limits a picture slide is definitely positioned in coordinate directions wth respect to the optical axis of the projector.

Still another object is to provide a structure made up of simple parts which can be economically manufactured and assembled and disassembled thus substantially reducing the cost of manufacture, assembly and repair.

Further and more specific objects, features, and advantages will more clearly appear from a consideration of the following description, especially when considered in connection with the accompanying drawings which fom part of the specification and which illustrate a preferred form which the invention may assume.

Briefly and generally considered, the invention

2 is adapted to be used in connection with a projector having an optical axis and a slide passage disposed transversely to said axis and includes a slide carrier to be reciprocated in said passage and having a chamber to receive a slide therein bearing against one end of the chamber, with positioning means on the carrier adapted to be moved into engagement with the other side of the slide as the carrier is moved to place the slide in projection position whereby the slide is definitely positioned in the chamber.

More particularly, the structure includes a guide frame in said passage with a central aperture, a carrier frame slidable in said guide frame and adapted to receive two slides therein with outer sides bearing in V-shaped end walls of the carrier, and positioning means on the carrier intermediate the inner sides of the slides to be moved into engagement with the inner side of the slide which is being moved into projecting position to hold the slide in a definite position.

More particularly, the positioning means is a roller with a peripheral groove riding in a V-shaped slot in the carrier and urged by a spring into one limb or the other of the slot, and means on the guide frame to move the roller as the carrier is moved to present a slide for projection so that the roller will engage the inner side of that slide. The slide therefore will have its opposite sides lying in grooved surfaces which are physically determined with respect to the optical axis so that the slide will then be laterally and longitudinally positioned in the proper plane of the optical axis. The guide frame preferably is provided with end walls to limit the extent of the reciprocation of the carrier plate therein.

The present preferred form which the invention may assume is shown in the accompanying drawings which form part of the specification, and in which, Fig. 1 is a partial perspective view of a projector provided with our novel and useful slide changer;

Fig. 2 is a plan view of the slide changer removed from the projector and showing the carrier plate in one extreme position;

Fig. 3 is a front elevation of the device with the parts in the same position and with a small portion broken away;

Fig. 4 is a similar view showing the parts in the other extreme position, and with another portion broken away;

Fig. 5 is a partial horizontal section through the device and taken on the line 5—5 of Fig. 3; and Fig. 6 is a vertical cross section through the device, taken on the line 6—6 of Fig. 3.

Leaving the description of the operation until later in the specification, and confining ourselves now to the structure of the device, it will be seen from a consideration of Fig. 1 that the projector 10 is provided with an adjustable lens casing 11 supported on a housing 12 which has a slide passage 13 therein, in which may be removably adjusted a temporarily fixed guide frame 14 in which is adapted to reciprocate a slide carrier frame 15 having laterally extending handles 16 at each end, which enable the carrier frame to be moved back and forth within the fixed frame 14 to successively present the slides in the carrier into registration with the optical axis of the projector.

The slide passage or opening 13 is disposed transverse to the optical axis of the projector and its longitudinal center line is disposed in a predetermined plane transverse to the optical axis and having a definite relation thereto, such as being in the focal plane of the lens system. This is important because the invention has to do with maintaining the slides when in projecting position in definite position with respect to the optical axis and this definite plane.

Referring to the drawings, the fixed guide frame generally numbered 14 heretofore comprises spaced plates 17 and 18 (Figs. 2 and 6), each having a long lower edge 19 and a shorter upper edge 20. The side edges 21 of these plates slope downwardly and outwardly and thus permit clearance to expose the operating handles 16 and the ends of the carrier plate or frame 15, Fig. 1, when the carrier plate or frame is in either extreme end position to permit ready access to the handles and to the slide pockets in the carrier frame 15. The plates 17 and 18 are spaced at their tops by means of a plate 22 suitably connected thereto as by screws 23 (Fig. 3), and at the bottom by means of a long bar or plate 24, Figs. 4 and 6, connected thereto also by any suitable means, such as screws 25. The plate 24 has up-turned ends 26, Fig. 3, which act as limiting stops to the movement of the carrier frame 15 within the guide frame 14. The guide frame is provided with a projection aperture 27 formed in each of plates 17 and 18, and these apertures are in alinement with each other and are in alinement with the optical axis of the projector when the guide frame is properly disposed in the slide passage 13. Opening from each lateral edge of the apertures 27 are slots 28 for a purpose later to be set forth in detail.

Referring now to the carrier frame generally numbered 15, it comprises spaced plates 29 and 30 which at their ends are drawn together and fastened by screws 31, Figs. 3 and 4, to form upwardly and outwardly extending handle portions 16. These plates at their top edges are spaced by means of a short spacer plate 32 fastened to the plates by means of screws 33. At their bottom edges the plates 29 and 30 are spaced by means of two spaced bars 34 and 35, Fig. 3, disposed on each side of the vertical center line of the carrier frame 15, and connected thereto in any suitable manner as by welding.

The carrier frame 15 and the plates 29 and 30 are each provided with a pair of projection apertures 36 and 37. As shown these apertures are adapted to be respectively disposed in registration with the projection apertures 27 in the guide frame 14 as the carrier frame is positioned at one end or the other within the guide frame 14. It will be noticed that the ends of the plates 29 and 30 have their ends drawn together to form the handles 16. This provides a V-shaped end wall 30', Fig. 2, at each end of the chamber formed between these two plates, and the apexes of these V-shaped walls are in registration with the longitudinal center line of the carrier and consequently when the carrier is mounted on the guide frame, will be in the above mentioned predetermined plane related to the optical axis of the projector.

Midway the length and height of the side plates 29 and 30 are disposed therein alined V-shaped slots 38. Disposed between the plates 29 and 30 is a positioning element in the form of a grooved roller 39 having oppositely extending stems 40 adapted to ride in the said slots 38. A spring 41 is connected at one end to the roller 39 and at the other end to a cross pin 42 extending between the plates 29 and 30 near the bottom thereof and lying between the spaced bars 34 and 35. The spring 41 naturally tends to maintain the roller 39 in one or the other limb of the V-shaped slot 38. The ends of the stems 40 of the roller 39 extend slightly beyond the outer faces of the plates 29 and 30, and as the carrier plate 15 is moved in one direction or the other the stem ends will contact the end walls of the slots 28 in the guide frame before the carrier arrives at the end of its travel in that direction, and this will force the roller 39 up the incline in the slot to the top. As the carrier plate 15 arrives at the end of its movement the roller 39 has been forced just past the top of one limb of the slot 38, and the spring 41 will, therefore, snap it down into the bottom of the adjacent limb of the slot. Motion in the opposite direction will cause the roller to be transferred to the adjacent limb and so on.

In the operation of the device, the guide frame generally numbered 14 is inserted into the slide passage 13 in the objective housing 12 and by any suitable means (not shown) is disposed therein so that the projection aperture 27 therein is alined with the optical axis of the device. Let us assume then that the carrier frame generally numbered 15 is then moved to the extreme right, as shown in Fig. 4, and a picture slide 43 is inserted in between the side plates 29 and 30 of the carrier frame with its right side resting in the right hand V-shaped end wall 30' of the carrier. Since the carrier frame 15 has no bottom, the bottom of the slide 43 rides along the smooth top of the plate 24 as the carrier frame is moved to the left to the position shown in Fig. 3.

It will be apparent that during this leftward movement of the carrier frame 15, the stems 40 of the roller 39 will encounter the end walls of the left-hand slots 28. Continued movement of the carrier frame to the left will, therefore, cause the roller to ride up following the left limb of the V-slot 38 and just before the carrier reaches its extreme left position, the roller rides over the top of the slot 38 and the spring 41 snaps it down into the lower end of the right-hand limb of the slot 38. In this position of the roller 39 as seen in Fig. 3, it is clear that the roller 39 is pressed snugly against the left-hand edge of the slide 43, which is nested in the groove of the roller 39 and with its right-hand edge nested in the bottom of the groove of the right-hand V-shaped end wall 30' of the carrier frame. This action can then be seen to assure the lateral positioning of the slide 43 with respect to the optical axis of the system and the accurate location of the slide in the proper predetermined plane above mentioned with respect to the same optical system. In other words, this device provides means whereby, after a slide is introduced into a carrier frame and as the frame is moved to place the slide in alinement with the optical axis of the system, said means will automatically position the slide laterally with respect to the axis and in a definite plane with respect thereto. It is obvious without further description that, in moving the carrier to the right from the position shown in Fig. 3 after another slide has been inserted into the left end of the carrier, the same action in reverse in regard to the roller 39 will take place. It is also apparent that since the upper corners of the carrier frame 15 are sloped outwardly and downwardly as shown, when the carrier is in one extreme position or the other, the corner of the slide 43 can be easily grasped by the fingers to remove it or to insert it without leaving any finger prints on the main picture portion of the slide 43.

The dot-and-dash lines show the previously projected picture slide 43 being removed, or a different picture slide being inserted, as the case may be.

Fig. 3 shows the picture slide positioning roll 39 in the right hand arm of the angular slot 38, in which position it is yieldingly retained by the resilient element 41, the roll having been moved away from the left hand picture slide 43 to release the latter for removal, which removal will leave the left hand compartment entirely unobstructed to permit the ready insertion of a different picture slide.

The picture slides fit loosely in their compartments when first inserted, but after the arrest of the positioning means by one or the other of the closed ends of the opposed recesses 28, continued travel of the slide frame or carrier will cause the appropriate arm of the angular slot 38 to cam the grooved slide-positioning roll upwardly until the apex of the angular slot escapes past the stem 40 of the positioning roll, whereupon the spring 41, which has been additionally tensioned by the camming action of the angular slot, will snap the roll down the opposite arm of the slot to snugly press the roll against the adjacent inner edge of that picture slide which has been advanced to register with the optical axis. Contact of the roll with the inner edge of such picture slide will shift the slide to press the outer side edge thereof into the adjacent opposed V-shaped outer wall of the slide compartment to center the picture slide relatively to the projection aperture.

Referring to Figs. 3 and 4 in greater detail and assuming that the slide carrier is being shifted from left to right, just prior to the contact of the lower right hand corner of the slide carrier with its right hand abutment 26, the stem or journal 40 of the positioning roll 39 contacts the rear abutment wall of the corresponding recess 28, which wall arrests farther travel of the roll towards the right, but does not prevent the slide carrier from completing its travel to the right. As the slide carrier completes the slight remainder of its travel to the right, the camming action of the wall of the angular slot on the roll operates to withdraw the positioning roll from the adjacent inner edge of the right hand slide. Immediately after the apex of the angular slot escapes past the stem or journal 40 of the roll, the slide carrier is practically at the end of its right hand travel, but the tensioned spring 41 is now free to draw the positioning roll farther to the left, independently of the slide carrier and in a direction opposite to that in which the slide carrier traveled, whereby to completely release the right hand slide for removal, and simultaneously advance the pressure roll toward the inner edge of the left hand picture slide to press the outer side edge of the left hand picture slide against the outer left hand wall of its compartment.

Due to the presence of the separating block 32 which divides the slide carrier chamber into two slide-receiving compartments, the inner edges of the slides cannot overlap by reason of careless insertion, for instance. Hence, the spring-pressed roll, also located intermediate the two compartments and common to both, will always operate against the inner side edges of the two picture slides alternately.

Attention is also directed to the fact that, in the form of the invention illustrated, it is the spring 41 which presses the roll against the inner side edges of the respective picture slides, thus avoiding damage to the slides as would be caused by contact of the roll with the side edges of the slides while the roll is travelling with the positively driven slide carrier.

While the device herein shown and described is a preferred form which the invention may assume, it is not to be limited to such form since many changes and modifications may be made in the form of the device without departing from the spirit and scope of the invention in its broadest aspects. Hence it is not intended to limit the invention herein to the form shown, except insofar as it may be limited by the language or scope of any one or more of the appended claims.

What we claim as our invention is:

1. In a projector having an optical axis and a slide passage disposed transversely to said axis, a slide carrier adapted to be reciprocated in said passage and having a chamber to receive a slide therein with one side bearing against the end of the chamber, a resiliently mounted roller on the carrier movable to engage the other side of the slide, and cam means for guiding the roller operable as the carrier is moved in a direction to present the slide to the optical axis, to snap said roller into engagement with said other side of the slide to position the slide definitely in the chamber.

2. In a projector having an optical axis and a slide passage disposed transversely to said axis, a slide carrier adapted to be reciprocated in said passage and having a chamber to receive a pair of slides therein with the outer sides of the slides bearing against the ends of the chamber, a resiliently mounted roller on the carrier intermediate the inner sides of the slides and movable to engage the inner sides, and cam means operable to guide the roller as the carrier is moved in either direction to present a slide to the optical axis, to operate said roller to move it into engagement with the inner side of the slide thus presented and to assure that the slide is positioned definitely in the chamber.

3. In a projector having an optical axis and a slide passage disposed transversely to said axis, a slide carrier adapted to be reciprocated in said passage, and having a chamber to receive a slide therein with one side bearing against the end of the chamber, a slide-positioning roller shiftably mounted for bodily movement in said chamber and having a journal, said carrier having a V-shaped slot therein, a portion of said journal extending into said slot, resilient means on said carrier to engage the roller to yieldingly hold it in either limb of said slot, and arresting means effective as the carrier is moved in a direction to present the slide to the optical axis, to snap said roller from one limb of the slot into the other limb to engage with the other side of the slide to position the slide definitely in the chamber.

4. In a projector having an optical axis and a slide passage disposed transversely to said axis, a slide carrier adapted to be reciprocated in said passage, and having a chamber to receive a pair of slides therein with the outer sides of the slides bearing against the ends of the chamber, a slide-positioning roller bodily shiftable in said chamber intermediate the adjacent inner sides of the slides, said carrier having a V-shaped slot therein, a journal on said roller extending into said slot, resilient means on said carrier to engage the roller and yieldingly hold it in either limb of said slot, and arresting means effective as the carrier is moved in either direction to present one or another slide to the optical axis, to snap said roller from one limb of the slot into the other limb to engage the roller with the inner side of that slide thus presented, to definitely position the slide in the chamber.

5. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber to receive a slide therein with one side bearing against the end of the chamber, a resiliently mounted roller on the carrier movable to engage the other side of the slide, and arresting means on the guide frame effective as the carrier is moved in a direction to present the slide to the optical axis to engage said roller and snap it into engagement with said other side of the slide to position the slide definitely in the chamber.

6. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber to receive a pair of slides therein with the outer sides of the respective slides bearing against the adjacent ends of the chamber, a resiliently mounted roller on the carrier intermediate the inner sides of the slides and movable to successively engage said inner sides, and means on the guide frame effective, as the carrier is moved in either direction to present a slide to the optical axis, to engage said roller and snap it into engagement with the inner side of the slide thus presented, to position the slide definitely in the chamber.

7. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber to receive a slide therein with one side bearing against the end of the chamber, a roller in said chamber, said carrier having a V-shaped slot therein, a portion of said roller extending into said slot, resilient means on said carrier to engage the roller and tending to hold it in either limb of said slot, and means on the guide frame effective as the carrier is moved in a direction to present the slide to the optical axis to engage said roller and snap it from one limb of the slot into the other into engagement with the other side of the slide to position the slide definitely in the chamber.

8. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber to receive a pair of slides therein with the outer sides of the slides bearing against the ends of the chamber, a roller in said chamber intermediate the inner sides of the slides, said carrier having a V-shaped slot therein, a portion of said roller extending into said slot, resilient means on said carrier to engage the roller and tending to hold it in either limb of said slot, and means on the guide frame effective as the carrier is moved in either direction to present a slide to the optical axis to engage said roller and snap it from one limb of the slot into the other into engagement with the inner side of the slide thus presented, whereby the slide is definitely positioned in the chamber.

9. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber with V-shaped end walls to receive a slide therein with one side bearing in one of the V-shaped walls, a roller in said chamber and having a V-shaped peripheral groove therein, said carrier having a V-shaped slot therein, a portion of said roller extending into said slot, resilient means on said carrier to engage the roller and tending to hold it in either limb of said slot, and means on the guide frame effective as the carrier is moved in a direction to present the slide to the optical axis to engage said roller and snap it from one limb of the slot to the other into engagement with the other side of the slide to cause said side to lie in the groove, whereby the slide is definitely positioned laterally and longitudinally with respect to the optical axis.

10. In a projector having an optical axis and a slide passage disposed transversely to said axis, a guide frame to be disposed in said passage and having an aperture to be alined with the optical axis, a slide carrier adapted to be reciprocated in said guide frame, means on the guide frame to limit the extent of reciprocation in either direction, said carrier having a chamber with V-shaped end walls to receive a pair of slides therein with the outer sides of the slides bearing in the V-shaped walls, a roller in said chamber and having a V-shaped peripheral groove therein adjacent the inner sides of the slides. said carrier having a V-shaped slot therein, a portion of said roller extending into said slot, resilient means on the carrier to engage the roller and tending to hold it in either limb of the slot, and means on the guide frame effective as the carrier is moved in either direction to present a slide to the optical axis to engage said roller and snap it from one limb of the slot to the other into engagement with the inner side of the slide thus presented to cause said side to lie in the peripheral groove, whereby the slide is definitely positioned laterally and longitudinally with respect to the optical axis.

11. A guide frame for slide changers which comprises spaced plates with side edges sloping downwardly, a bottom plate disposed between the bottom edges of the spaced plates, said bottom plate having limiting upturned ends, said first-mentioned plates having alined centrally disposed apertures therein, and oppositely and laterally extending slots opening into said apertures.

12. A carrier frame for slide changers which comprises spaced plates drawn together near their ends to form a chamber with V-shaped end walls, the plates extending outwardly and upwardly from the ends of the chamber to form handle portions, the upper end corners of the walls of the chamber being downwardly and outwardly sloped to provide clearance for the edge of a slide disposed in said chamber, said plates having pairs of alined apertures formed therein in pairs equidistant from the vertical center line of the plates, alined V-shaped slots in said plates between said apertures and symmetrically disposed with respect to said center line, a grooved roller in said slot, and a spring on the carrier and engaging said roller and tending to hold it in one or the other of the limbs of said slot.

13. In a projector having a guide frame with an aperture around the optical axis of the projector and a slide carrier passageway disposed transversely to said axis, a slide carrier adapted to be reciprocated in said passage, said slide carrier having front and rear walls spaced apart to form a chamber to receive two slides with the edges of the slides bearing against the ends of the chamber, said walls having apertures therein which may be moved into alignment with the aperture in the guide frame, each of said walls also having a substantially angular slot formed therein, a roller carried by the side walls between the said apertures and dividing the chamber into two compartments, one compartment for each of the two slides, a shaft on which said roller is mounted, said shaft extending outwardly through the slots in the front and rear walls and extending beyond the outer surfaces of said walls; and arresting means on each side of the aperture of the guide frame to be engaged by said shaft prior to the completion of movement of the slide carrier, to enable the roller to move into engagement with a slide as the carrier is moved to present that slide to the optical axis.

14. In a projector, a guide frame having an aperture around the optical axis of the projector and having a slide carrier passageway disposed transversely of said axis, a slide carrier having front and rear walls with two slide receiving chambers between said walls to receive two slides, said walls having aligned angular slots located intermediate said chambers, a shaft projecting through said slots and extending beyond said walls, a roller mounted on said shaft between the side walls, said shaft engaging the side edges of the guide frame aperture to enable said roller to shift into contact with the inner side edge of one or the other of the slides when the slide carrier is moved to position either of the slides in the optical axis of the projector.

15. In a projector having an optical axis, and a slide passage disposed transversely to the axis; a guide frame disposed in the passage, and having an aperture alined with the optical axis; a slide carrier reciprocable in the guide frame; means to limit the extent of travel of the slide carrier in either direction; the slide carrier having an apertured chamber to loosely accommodate a slide; positioning means mounted on the slide carried to travel therewith and shiftable relatively to the slide carrier, into and out of engagement with one side edge of the slide; and opposed arresting means spaced a less distance apart than the extent of travel of the slide carrier in one direction, and relatively to which the slide carrier shifts, said arresting means effective, as the slide carrier and its slide travel in either direction, to arrest the positioning means prior to the completion of movement of the slide carrier, whereby continued travel of the slide carrier after the arrest of the positioning means advances said side edge of the slide towards, or withdraws it from, the positioning means, depending upon the direction of travel of the slide carrier.

16. In a projector having an optical axis, and a slide passage disposed transversely to the axis; a guide frame disposed in the passage, and having an aperture alined with the optical axis; a slide carrier reciprocable in the guide frame; means to limit the extent of travel of the slide carrier in either direction; the slide carrier having an apertured chamber to loosely accommodate a slide; positioning means mounted on the slide carrier to travel therewith and shiftable relatively to the slide carrier, into and out of engagement with one side edge of the slide; and opposed arresting means spaced a less distance apart than the extent of travel of the slide carrier in one direction, and relatively to which the slide carrier shifts, said arresting means effective, as the slide carrier and its slide travel in either direction, to arrest the positioning means prior to the completion of movement of the slide carrier, whereby continued travel of the slide carrier after the arrest of the positioning means advances said side edge of the slide towards, or withdraws it from, the positioning means, depending upon the direction of travel of the slide carrier; and means to subsequently impart movement to the positioning means relatively to the slide carrier to engage the positioning means with the advanced slide.

17. In a projector having an optical axis, and a slide passage disposed transversely to the axis; a guide frame located in the passage, and having an aperture alined with the optical axis; a slide carried reciprocable in the guide frame; means to limit the extent of travel of the slide carrier in either direction; the slide carrier being chambered to accommodate a pair of slides; a unitary positioning means common to the pair of slides and mounted in the chambered portion of the slide carrier for movement with, and also relatively to, the slide carrier, said positioning means being located substantially midway between the ends of said chambered portion and intermediate the individual slides to move into and out of engagement with the respective inner side edges of the pair of slides alternately; and opposed arresting means spaced a less distance apart than the extent of travel of the slide carrier on one direction, and relatively to which the slide carrier shifts, said arresting means effective as the slide carrier and its slides travel in either direction, to arrest the positioning means common to the pair of slides against advance, prior to the completion of movement of the slide carrier, whereby continued travel of the slide carrier in either direction, after the arrest of the positioning means, advances the inner side edge of one of the slides of a pair towards the positioning means and simultaneously withdraws the inner side edge of the other of the slides of the pair from the positioning means.

18. In a projector having an optical axis and a slide passage disposed transversely to the axis; a guide frame disposed in the passage and having a projection aperture alined with the optical axis; a slide carrier reciprocable in the guide frame and chambered to loosely accommodate a slide; the slide carrier having an aperture communicating with the chamber; means on the guide frame to limit the extent of travel of the slide carrier in at least one direction; movable positioning means mounted on the slide carrier for movement therewith and for limited relative movement to shift into and out of engagement with a side edge of the slide to position the latter relatively to the aperture in the slide carrier and to release the slide respectively; opposed abutment walls on the guide frame to arrest the positioning means prior to the completion of travel of the slide carrier in either direction, whereby continued movement of the slide carrier in one direction, after the arrest of the positioning means, by one abutment wall, advances the slide towards the arrested positioning means, and travel of the slide carrier in the opposite direction after the arrest of the positioning means by the opposed abutment wall, withdraws the slide from the arrested positioning means; and means effective to shift the positioning means subsequently to its arrest by either opposed abutment, and relatively to the slide carrier, in a direction opposite to the direction of travel of the slide carrier, to withdraw the positioning means farther from the adjacent side edge of the slide, when the slide carrier is moved in a direction to displace the slide relatively to the projection aperture, and to advance the positioning means against the adjacent side edge of the slide when the slide carrier is moved in a direction to present the slide to register with the projection aperture.

ARTHUR J. BRADFORD.
THOMAS I. RESS.

REFERENCES CITED

The following references are of record in the file of this patent:

UNITED STATES PATENTS

| Number | Name | Date |
|---|---|---|
| 77,300 | Marcy | Apr. 28, 1868 |
| 598,938 | Johnson | Feb. 15, 1898 |
| 1,035,872 | Goodrich | Aug. 20, 1912 |
| 2,136,746 | Kleerup | Nov. 15, 1938 |
| 2,298,369 | Greaves | Oct. 13, 1942 |
| 2,298,413 | Reid | Oct. 13, 1942 |
| 2,335,326 | Walter | Nov. 30, 1943 |

FOREIGN PATENTS

| Number | Country | Date |
|---|---|---|
| 1,353 | Great Britain | of 1886 |
| 16,177 | Great Britain | of 1892 |
| 173,109 | Germany | July 16, 1906 |